Jan. 14, 1958 C. J. ROBINSON 2,819,629
METHOD OF MAKING SHANKS FOR AUGER BITS AND THE LIKE
Filed Feb. 5, 1954 2 Sheets-Sheet 2
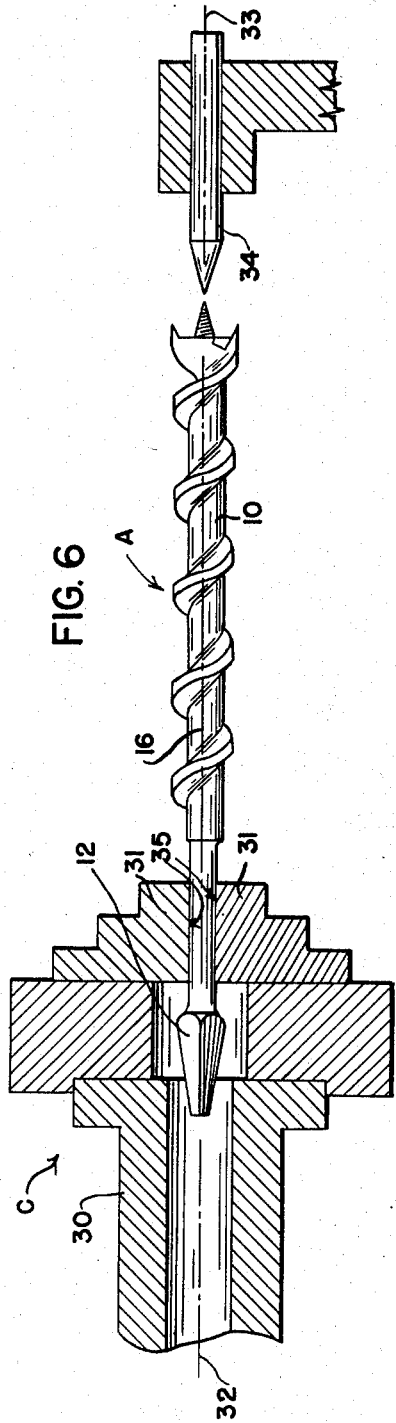
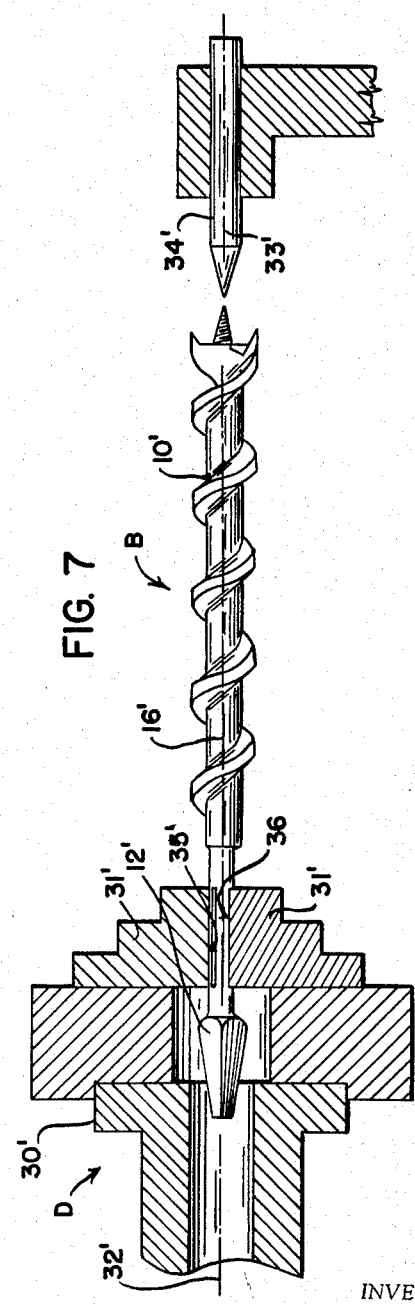
INVENTOR
Clarence J. Robinson
BY
ATTORNEYS

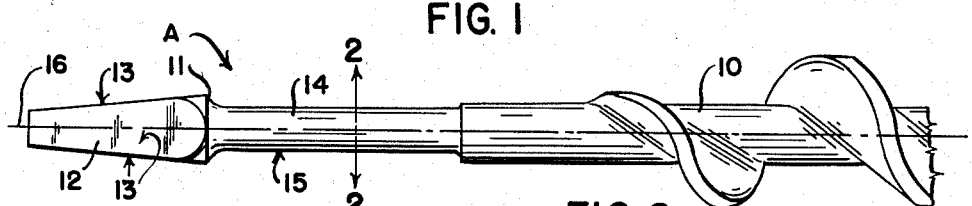
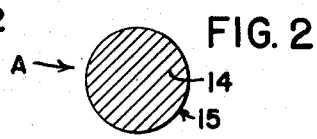
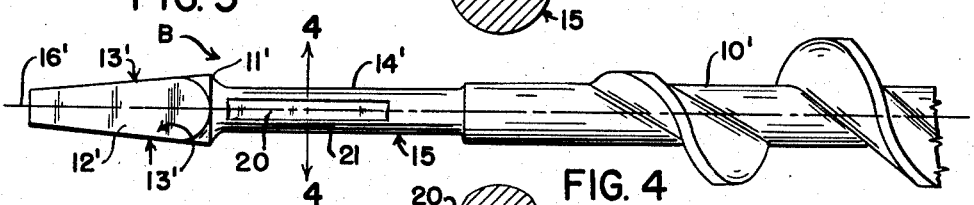
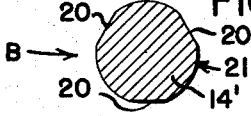

United States Patent Office 2,819,629
Patented Jan. 14, 1958

2,819,629

METHOD OF MAKING SHANKS FOR AUGER BITS AND THE LIKE

Clarence J. Robinson, Wilmington, Ohio, assignor to The Irwin Auger Bit Company, Wilmington, Ohio, a corporation of Ohio Application February 5, 1954, Serial No. 408,552

2 Claims. (Cl. 76—108)

This invention relates to metal tool parts and their manufacture and more particularly to the shank portions of elongated metal tool parts having tapered square heads and to the methods of manufacturing the same. Examples of such portions are the shanks of auger bits.

The term shank, as applied to a tool, is that part of a tool which is used to connect the tool to the driving or turning agent, such as a handle, bit-brace, and various types of chucks and which shank consists of a tapered head, square in transverse section, and an adjacent cylindrical portion.

The tapered heads, square in transverse section, commonly used on auger bits are adaptable to the common bit-brace which is equipped for chucking or securely holding the bit in place while boring. The common bit-brace has a chuck with two adjustable jaws which are made to receive the tapered head of the shank of such tools. This type of chuck is not suitable for shanks of tools which do not have a tapered shank head.

The type of chuck for clamping and holding drilling and boring tools in drill presses and hand held electric drills (power driven tools) is constructed differently from the bit-brace type of chuck. Most power driven tools use an adjustable type chuck which has three jaws equally spaced within the chuck body. These chuck jaws are so constructed that they close in and apply their tightening action on a cylinder type of shank. This type of chuck is suitable for boring and drilling tools which has straight round or cylindrical type of shanks. Twist drills for drilling holes in metal employ the straight round type of shank.

There is an increasing tendency for using boring and drilling tools in power driven tools instead of hand driven tools. Especially in the wood boring tool field most common bits have a tapered shank head suitable only to the common bit-brace and not the type of chuck for power driven tools.

Some users of power driven tools have been known to cut off the tapered shank head of such tools and then use the tools by chucking the adjacent round shanks. Ordinarily, the round shanks adjacent the tapered shank heads on such tools are made by forging methods which do not assure accurate concentricity with the longitudinal axis of the tool. When using power tools with a round shank not concentric with this axis, this tool does not run true and the amount of eccentricity is known to the user as a "wobble."

To correct such a condition, it is the purpose of this invention to make a shank with a tapered shank head, square in transverse section, at the free end portion of the tool adjacent a round shank portion which has been machined during the method of manufacture to run true with the longitudinal axis of the tool. By so doing, a tool having such a shank may be used in a bit-brace, or the tapered shank head may be cut off leaving a truly round shank for use in a power driven tool.

In addition to the machined round shank for true running, flats or grooves may be machined in the chucking area for the purpose of allowing the chuck jaws to seat on the flats or in the grooves to prevent slipping under heavy load or high torque. Such flats or grooves would be accurately and equally spaced to accommodate the chuck jaw.

I am aware that tools having a tapered head, square in transverse section, with an adjacent cylindrical portion are not new; that tools having straight round shanks are not new; and that tools having flats or grooves for the chucking jaws to seat in are not new.

I am also aware that it has been proposed, in U. S. Patent No. 2,029,447 to Howland M. Swain, granted February 4, 1936, to provide auger bits having tapered square heads with adjacent cylindrical portions and so designed that the heads may be severed whereby the bits may be employed in a bit-brace or a power drill. But I am not aware of the cylindrical portion, next adjacent the tapered head of an auger bit shank, being processed to provide a machined truly cylindrical surface for association with the gripping device of a modern high-speed power drive means; or of a machined otherwise truly cylindrical portion of an auger bit shank wherein the surface of the truly cylindrical portion is broken by equally spaced-apart areas or faces of the areas or faces truly paralleling the longitudinal axis of the cylindrical surface, whereby the shank may be gripped by power drive means and moved in a path with said axis truly coincident with the drive axis of said drive means.

The disadvantage of the auger bit of U. S. Patent No. 2,029,447 was that the entire shank was produced by forging, and no further machine work performed on the adjacent cylindrical section, where an adjustable chuck holds the bit into alignment with power tools, such as an electric drill or machine tool. Even with care in forging the shank of this patent, the bit would sometimes be somewhat eccentric to the chucking agent of a machine tool.

An important object of this invention is to provide in an elongated tool part, for use in modern high-speed power drive means, a combination type of shank which has a tapered end portion square in transverse section, and an accurately machined round shank portion adjacent thereto, which allows the user to purchase a single tool suitable for either hand or power tools.

Another important object of this invention is to provide, in an elongated forged tool part for use in modern high-speed power drive means, a shank which includes, next to the tapered head, a portion truly cylindrical, whereby the shank, after removal of the tapered square head, may be gripped by power drive means and moved in a path with the longitudinal axis of the shank truly coincident with the drive axis of said drive means.

Another important object is to provide, in an elongated tool part for use in modern high-speed power drive means, a shank which includes, next to the tapered head, a portion otherwise truly cylindrical except that the truly cylindrical surface is broken by equally spaced apart areas or faces with all portions of these areas or faces truly paralleling the longitudinal axis of the shank, whereby the shank may be gripped by power drive means and moved in a path with said axis truly coincident with the drive axis of said drive means.

A further important object is to provide, in an elongated tool part for use with modern high-speed power drive means, a cylindrical shank portion next to a tapered head portion, the cylindrical portion having longitudinally-extending, spaced-apart truly flat areas or faces with all portions of the areas or faces truly paralleling the longitudinal axis of the shank, and these areas or faces broken by spaced-apart arcuate areas or faces with all portions of these last areas or faces truly paralleling the longitudinal axis of the shank and spaced a truly equal distance from said axis, whereby the shank may be gripped by a power drive means and moved in a path with said axis truly coincident with the drive axis of said drive means.

Additionally, an important object of the invention is to provide a method for the manufacture of shanks of a tool part having the characteristics described above.

Other objects and advantages of this invention will be apparent during the course of the following detailed description of the invention, taken in connection with the accompanying drawing, forming a portion of this disclosure, and in which drawing:

Fig. 1 is a side elevation of one form of the new tool part.

Fig. 2 is an enlarged transverse section thereof, on the line 2—2 of Fig. 1.

Fig. 3 is a side elevation of another form of the new tool part.

Fig. 4 is an enlarged transverse section thereof, on the line 4—4 of Fig. 3.

Fig. 5 is a diagrammatic showing of the method of manufacturing the tool parts of Figs. 1 to 4 inclusive.

Fig. 6 is a diagrammatic showing of one step in the manufacture of the tool part of Figs. 1 and 2.

Fig. 7 is a diagrammatic showing of one step in the manufacture of the tool part of Figs. 3 and 4.

In the drawing, wherein for the purpose of illustration are shown several forms of the invention, the letter A designates one form and B a second form; C and D diagrammatically designated testing apparatus.

The form A of the invention contemplates an elongated tool part having a head portion 10 and shank 11 extending from the head portion. The head portion may be any suitable one, as the screw-flight portion of a bit, or the head portions of twist drills, reamers, counter-borers, counter-sinks, screw drivers and the like.

In Fig. 1, the shank is shown as having a tapered free end portion 12 with substantially flat faces 13 adapted to be gripped by the conventional chuck jaws of a manually-operated bit brace for example. Next adjacent the portion 12 is a portion 14 truly cylindrical with a truly circular transverse cross section as in Fig. 2. The peripheral surface 15 of the portion 14 is always tested for trueness, so that all portions of the surface will be an equal radial distance from the longitudinal axis 16 of the tool part.

A plurality of equally spaced-apart flat areas or surfaces 20, being longitudinally-extending flat areas or surfaces, generally known as flats, with all parts thereof truly paralleling the longitudinal axis 16' of the tool part B is provided. The provision of the surfaces of areas 20 will provide a plurality of equally spaced-apart arcuate surfaces 21 between the surfaces or areas 20.

In the method of manufacture, a suitable metal stock is provided, such as straight carbon steel (C–10–60) for example, and this is suitably processed, as by forging on trip hammers having suitable dies to provide the rough shank, having the portion 12 and approximately the portion 14 of Fig. 1. The head portion 10 may be then formed on trip hammers with dies suitably shaped to forge the desired shape to the twist which, at the same time, allows the forging operation to merge the head portion into the previously forged shank. Other parts of the head portion may be drop forged, as is well known in the art. However, the entire tool part A may be a drop forging.

After conventional annealing and straightening the head portion is finished as is also well known in the art, and a conventional heat treatment is provided for the tool part for hardening and tempering it.

Preferably, at the conclusion of the heat treatment, the portion 14 is carefully processed by machining the same in a lathe, cylindrical grinder or a centerless grinder, with the tool part so held while being machined, as to produce a straight round portion 14, truly concentric with the longitudinal axis of the tool part A with its longitudinal axis, if the shank portion 14 is truly cylindrical, coincident with the axis of rotation 32 of the chuck body 30 and longitudinal axis 33 of the fixed indicator pointer 34. If the arcuate portion 35 of each jaw 31 clutches a portion 14 which is not truly cylindrical, then the free end of the head portion 11 will describe a circle or an ellipse about the longitudinal axis of the pointer 34, and the tool part A must be re-machined until it tests true, or is discarded. If the flat portion 36 of each jaw 31' of the apparatus D clutches a flat of the shank 11' of Fig. 7, while the arcuate portion 35' of each jaw grips a portion of the arcuate surface 21 and the chuck body 30' is rotated causing the longitudinal axis 16' to coincide with the axis of rotation 32' of the chuck body 30' and with the longitudinal axis 33' of the indicator pointer 34' then the shank may be regarded as having peripheral surfaces 20 and 21 truly parallel with the longitudinal axis of the shank 11'. In the event this is not the result, then the tool part B must be re-machined.

The testing herein disclosed is given by way of example for testing the tool parts A and B so that, when the shank thereof of either is gripped by a power drive means and moved in a path, the axis of the movement of the tool part and drive means will be coincident.

The tool parts of this disclosure may, of course, be employed with the tapered free end portions 12 and 12' engaged by the jaws of a suitable manually operated handle or other holder or the tapered free end portions 12 or 12' may be cut off and the portion 14 or 14' employed with high-speed power drive means and when the portion 14 or 14' is properly gripped the longitudinal axis of the tool part will not describe a circle or ellipse nor wobble to the detriment of the work and the tool part.

What is claimed is:

1. The steps in the manufacture of an elongated metallic tool part having a head portion and an elongated shank provided with a free end portion and a third portion next adjacent the free end portion and extending from one end of the head portion, which include forging the entire shank; machining the forged shank at only said third portion until a machined peripheral part thereof results; firmly gripping said third portion at substantially equally spaced-apart like-sized areas about the periphery of said machined peripheral part thereof, said areas being equally spaced from one end of said third portion, rotating said elongated tool part; determining whether or not the longitudinal axes of the forged head portion and machined peripheral part are coincident as evidenced by the position of the longitudinal axis of the gripped and rotated machined peripheral part with respect to the longitudinal axis of the rotated forged head portion; releasing said elongated tool part; and repeating, if necessary, the machining, gripping, rotating and determining steps as above, until said axes are coincident.

2. The steps in the manufacture of an elongated metallic tool part having a head portion and an elongated shank provided with a free end portion and a third portion next adjacent the free end portion and extending from one end of the head portion, which include forging the entire shank; machining the forged shank at only said third portion until a machined peripheral part thereof results; firmly gripping said shank at said machined peripheral part; rotating said elongated tool part; determining whether or not the longitudinal axes of the forged head portion and machined peripheral part are coincident as evidenced by the position of the longitudinal axis of the gripped and rotated machined peripheral part with respect to the longitudinal axis of the rotated forged head portion; releasing said elongated tool part; and repeating, if necessary, the machining, gripping, rotating and determining steps as above, until said axes are coincident.

References Cited in the file of this patent

UNITED STATES PATENTS

| | | |
|---|---|---|
| 1,209,362 | Turner | Dec. 19, 1916 |
| 1,556,655 | Whitney | Oct. 13, 1925 |
| 2,029,447 | Swain | Feb. 4, 1936 |
| 2,453,000 | Daulton | Nov. 2, 1948 |
| 2,543,206 | Smith | Feb. 27, 1951 |
| 2,627,292 | Kronwell | Feb. 3, 1953 |